United States Patent [19]

Isaacs

[11] 4,433,216
[45] Feb. 21, 1984

[54] FACEPLATE ASSEMBLY FOR TELECOMMUNICATIONS TERMINALS AND OTHER TERMINALS

[75] Inventor: Robert B. Isaacs, Ottawa, Canada

[73] Assignee: Northern Telecom Limited, Montreal, Canada

[21] Appl. No.: 357,776

[22] Filed: Mar. 12, 1982

[51] Int. Cl.³ ............................................. H04M 1/02
[52] U.S. Cl. ..................................... 179/178; 40/336
[58] Field of Search .................. 179/178, 179; 40/336, 40/337

[56] References Cited

U.S. PATENT DOCUMENTS 3,345,769  10/1967  Nathan ................................ 179/178
3,480,743  11/1969  Engh .................................... 179/178
4,292,481   9/1981  Barnes ................................. 179/178

Primary Examiner—G. Z. Rubinson
Assistant Examiner—L. C. Schroeder
Attorney, Agent, or Firm—Sidney T. Jelly

[57] ABSTRACT

A faceplate assembly for a telecommunications terminal is of sandwich structure, having top and bottom members. A plurality of apertures through the members permit passage of pushbuttons and other activating members. Channels open at one end are associated with at least some of the apertures for the introduction of cards, having indicia relating to the associated activating member. The top surface of the top member has a non-glare finish. An opaque background color can be applied to the back surface of the top member, having clear windows aligned with the channels. Indicator areas can be provided adjacent to at least some of the apertures, for provision of lighted indication. These indicator areas can have translucent colored ink applied, on the back surface of the top member, to enhance the lighted indication.

7 Claims, 8 Drawing Figures

FACEPLATE ASSEMBLY FOR TELECOMMUNICATIONS TERMINALS AND OTHER TERMINALS

This invention relates to faceplate assemblies, such as are used for telecommunication terminals and other terminals. In many terminals, multiple pushbuttons are provided for special, identified, purposes. Thus, for example, a terminal may be a telephone having a faceplate assembly with a pushbutton dial and also a plurality of other pushbuttons for particular purposes. Thus some buttons may be for repertory dialing, the number which is dialed automatically by pressing on a pushbutton being preset, and also capable of being varied. Other buttons may be for other services and again these services can vary from telephone set to telephone set, and can be changed at will.

Other forms of terminals also have pushbuttons which provide particular purposes, which vary and can be altered.

A problem is providing attractive, efficient means for identifying the particular purpose or service provided by each pushbutton. It is often provided that a card is inserted under the faceplate. This is inconvenient in that the faceplate must be removed to access the card. Removal of the faceplate may be difficult, and in many instances is strongly discouraged. Also, with such arrangements, to ensure good visibility through the faceplate it is fully transparent with a polished surface. As a result there often occurs glare, which obstructs a clear view of the information behind the faceplate.

Sticking labels on the top surface of the faceplate is extremely undesirable. Such labels detract from the appearance of the apparatus, get dirty very quickly and generally are unsightly.

The present invention provides a faceplate assembly into which cards or labels can be slid, the cards fitting in closed channels between two members. The outer surface is given a non-glare surface treatment, which prevents, or at least reduces glare, but does not prevent observation of the information on the labels. Provision may be made for coloured areas for emphasizing the light emission from light emitting diodes (LED's).

The invention will be readily understood by the following description of an embodiment, by way of example, in conjunction with the accompanying drawings, in which.

Figure 5:
FIGS. 5 and 6 are cross-sections on the lines V—V and VI—VI respectively, of FIG. 4.
Figure 6:
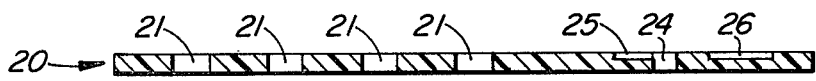
Figure 7:
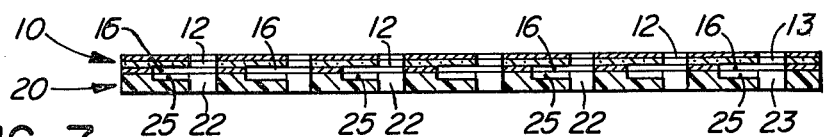
Figure 8:
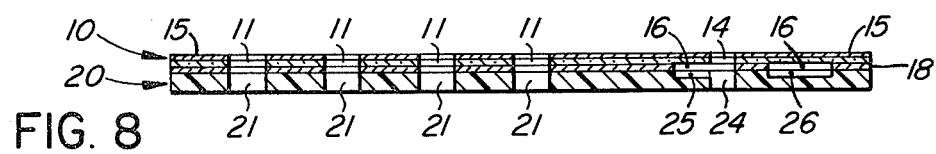

FIGS. 7 and 8 are cross-sections through an assembly of top and bottom members as in FIGS. 1 to 6, on the same lines as FIGS. 2 and 3 and 4 and 5.

Figure 1:
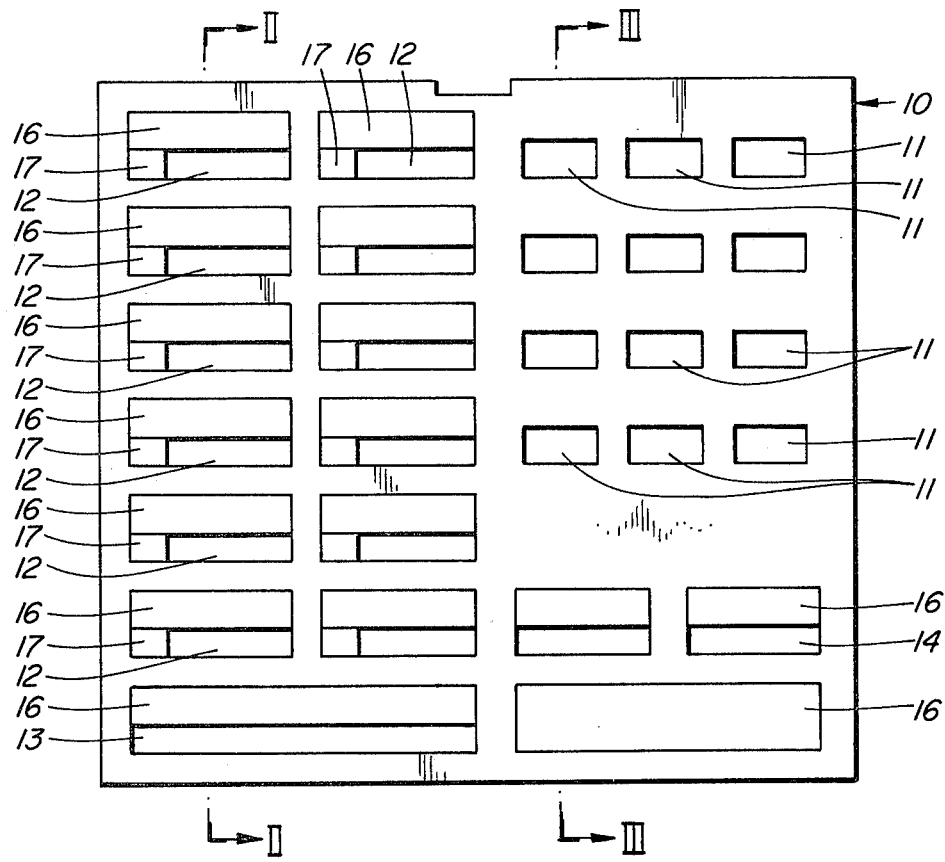
FIG. 1 is a plan view of one form of faceplate top member.
Figure 2:
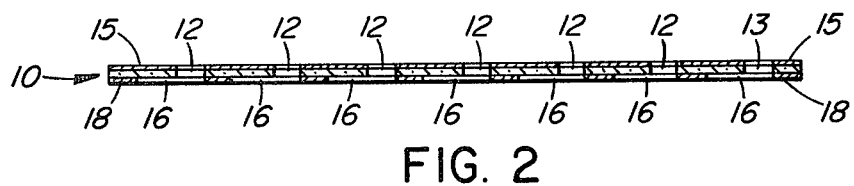
FIGS. 2 and 3 are cross-sections on the lines II—II and III—III respectively, of FIG. 1.
Figure 3:
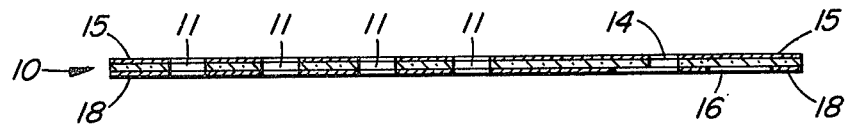

FIGS. 1, 2 and 3 illustrate a top member 10 of what is essentially a two member flat faceplate assembly. The top member 10 is of a clear, transparent, material, for example a plastic material, and in the example has a first plurality of apertures 11, in columns and rows, for a telephone dial, the dial pushbuttons extending up through the apertures 11. A further plurality of apertures 12 extend through the member for passage of further activating members, for example pushbuttons. These latter pushbuttons are used for various services. For example, the pushbuttons in apertures 12 may be used for repertory dialing, where a single push on a pushbutton causes out-dialing of a preset member. The pushbuttons may be used for other services. Further apertures 13 and 14 accept other activating members, such as pushbuttons or sliding controls, which again provide for preselected services. A typical thickness for member 10 is about .015 inches. Too great thickness can cause distortion of the information printed or otherwise depicted on the cards or labels.

The member 10 has an antiglare top surface. This surface can be obtained, for example, by applying a layer of antiglare material, or by a suitable treatment, as by etching or abrading. In FIGS. 2 and 3 the antiglare surface is illustrated as a separate layer, at 15, and very much exagerated in thickness. The layer indicated at 15 is intended to illustrate either alternative, that is an applied layer or a surface treatment.

The member 10 is normally given a base or background colour. This can be obtained, for example, by silk-screening an opaque ink on to the bottom surface of the member. This layer of ink, again much exagerated in thickness, is indicated at 18 in FIGS. 2 and 3. The ink is not applied in areas intended to be clear windows—16 in FIGS. 1, 2 and 3 or in indicator areas—17 in FIG. 1. The ink does not appear, of course, in the apertures 11, 12, 13 and 14. However, if the bottom member 20 is of opaque material, particularly if coloured, then the layer 18 can be omitted.

The indicator areas 17 are at the ends of the apertures 12. It is sometimes arranged that LED's are used to indicate actuation of a pushbutton and its associated service. A translucent ink—for example ruby red for LED's—can be applied on the areas, to enhance the colour of the indicator. If lighted indication was not provided, the translucent ink need not be applied, and the background colour could be extended over these areas.

Figure 4:
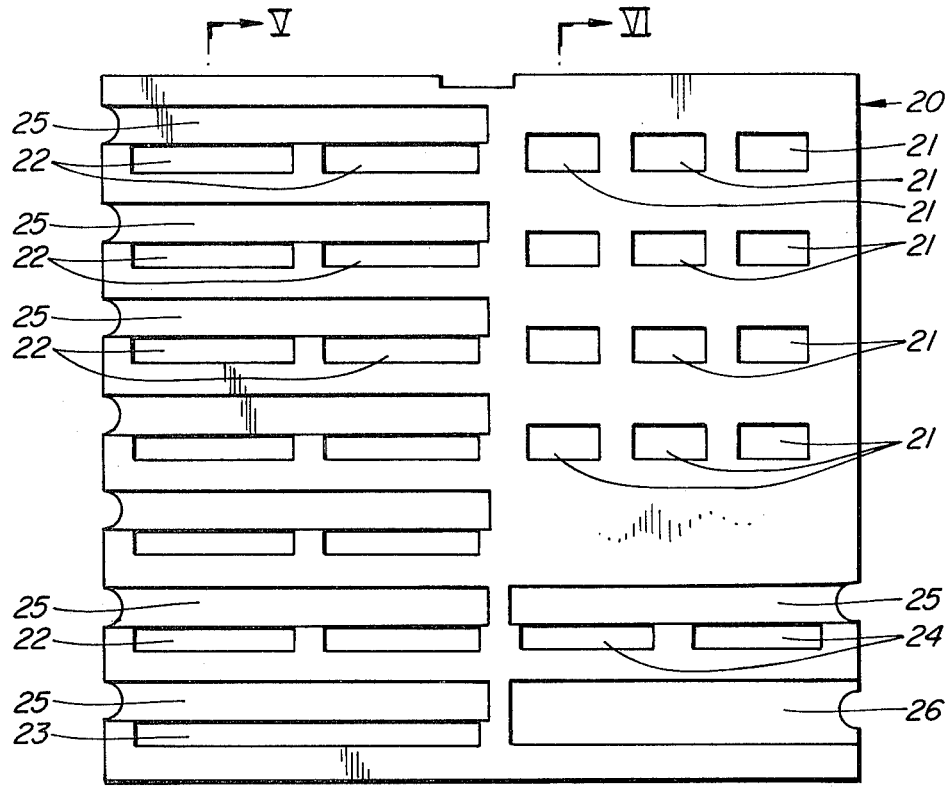
FIG. 4 is a plan view of a form of faceplate bottom member to suit the top member of FIG. 1.

FIGS. 4, 5 and 6 illustrate the bottom member 20 which assembles to, and under, the top member 10. A plurality of apertures 21, in columns and rows, are positioned to align with apertures 11 in the top member 10. Further apertures 22, 23 and 24 in the bottom member 20 are positioned to align with apertures 12, 13 and 14 respectively in the top member 10. The apertures 22 extend to underlie the indicator areas 17, for positioning of LED's, if these are provided. The bottom member can be of transparent or opaque material.

Formed in the top surface of the bottom member are a plurality of shallow recesses 25 and 26. In the example, recesses 25 are associated with pushbutton apertures 22, 23 and 24, and recess 26 is not associated with an aperture. The member, disposition and size of the recesses can be varied to suit requirements.

When the top and bottom members are assembled together, as seen in cross-section in FIGS. 7 and 8, the recesses 25 and 26 are closed over by the top member 10, and extend beneath the windows 16 of the top member. Thus there is provided a channel for each pair of apertures 22 in horizontal alignment, into which a card or other member having indicia can be slid. The channels are aligned with the windows of the top member and the information on the cards can readily be seen. At the same time the cards are protected, can readily be replaced and there is no glare from the top surface of the top member. The two members are usually permanently fastened together before attachment to the terminal, for example by an adhesive applied at preselected areas. The particular arrangement of pushbuttons, and associated cards, can be varied according to requirements, the cards being easily removed and changed by the user of the terminal.

Instead of forming the recesses 25 and 26 in the top surface of the bottom member 20, they can be formed in the bottom surface of the top member. A further alternative, but likely to be more costly, is to provide a third member, sandwiched between the top and bottom members, with slots formed in the third member, the slots defining card receiving grooves when assembled with the top and bottom members. In yet another alternative, if the assembly is mounted on a housing or some other member which is opaque, both members can be of transparent material, and the background colour layer 18 also omitted.

What is claimed is:

1. A faceplate assembly for a telecommunications terminal, comprising:
    two flat rectangular members in superposed position, a top member and a bottom member;
    a plurality of apertures in each member, the apertures in one member aligned with the apertures in the other member;
    a plurality of window areas in said top member, each window area associated with and adjacent to an aperture;
    means defining a plurality of channels between the top and bottom members, each channel extending to an edge of the faceplate assembly and open at said edge for insertion and removal of a card;
    each channel extending below at least one window area.

2. An assembly as claimed in claim 1, said top member having a non-glare top surface.

3. An assembly as claimed in claim 1, said top member having a opaque background colour layer on a bottom surface, said colour layer including windows at areas aligned with said channels.

4. An assembly as claimed in claim 1, said channels defined by grooves formed in a top surface of said bottom member.

5. An assembly as claimed in claim 1, including a first plurality of apertures in each of said top and bottom members, arranged in columns and rows, for passage of a telephone dial pushbutton therethrough; and a second plurality of apertures in said top and bottom members, said window areas associated with said second plurality of apertures.

6. An assembly as claimed in claim 5, including at least one further channel unassociated with an aperture.

7. An assembly as claimed in claim 1, said top and bottom members permanently assembled together in intimate contact with each other.

* * * * *